United States Patent
Löser et al.

(10) Patent No.: US 8,297,195 B2
(45) Date of Patent: Oct. 30, 2012

(54) MAGNETIC LEVITATION RAILWAY AND METHOD FOR ITS OPERATION

(75) Inventors: Friedrich Löser, Riemerling (DE); Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 476 days.

(21) Appl. No.: 12/519,270

(22) PCT Filed: Nov. 26, 2007

(86) PCT No.: PCT/DE2007/002123
§ 371 (c)(1),
(2), (4) Date: Jun. 15, 2009

(87) PCT Pub. No.: WO2008/086762
PCT Pub. Date: Jul. 24, 2008

(65) Prior Publication Data
US 2010/0043667 A1     Feb. 25, 2010

(30) Foreign Application Priority Data
Jan. 15, 2007  (DE) .......................... 10 2007 003 118

(51) Int. Cl.
*B60L 13/06*    (2006.01)
*B60L 3/00*     (2006.01)
(52) U.S. Cl. ........ 104/281; 104/282; 104/286; 104/249; 104/260
(58) Field of Classification Search ...................... 188/41, 188/42; 104/281, 282, 283, 284, 290, 292, 104/249, 260; 246/167 R, 182 R, 182 A, 246/182 C, 27, 28 R
See application file for complete search history.

(56) References Cited

U.S. PATENT DOCUMENTS
2008/0277534 A1*  11/2008  Ellmann et al. .......... 246/167 M FOREIGN PATENT DOCUMENTS
| DE | 26 04 688 A1 | 8/1977 |
|----|--------------|--------|
| DE | 30 04 705 A1 | 8/1981 |
| DE | 38 07 919 A1 | 9/1989 |
| DE | 102004013690 | 10/2005 |
| DE | 102004013994 | 10/2005 |
| DE | 102004018311 | 11/2005 |

* cited by examiner

*Primary Examiner* — Mark Le
(74) *Attorney, Agent, or Firm* — McGlew and Tuttle, P.C.

(57) ABSTRACT

A method for operation of a magnetic levitation railway which contains vehicles with a plurality of supporting magnets (20a ... 20j) and supporting runners (26) associated with them. In the event of a malfunction, the braking of the vehicle with the drive and braking systems switched off is brought about or assisted until a preselected destination stopping point is reached solely in that, even before the destination stopping point is reached, at least one of the supporting magnets (for example 20f, 20g) is switched off, and the magnetic levitation vehicle is placed on the track path (3) by means of the associated supporting runner (26), and is brought to rest at the destination stopping point by making use of the friction forces that occur as a result. A magnetic levitation vehicle is provided and operated in this way.

13 Claims, 7 Drawing Sheets

MAGNETIC LEVITATION RAILWAY AND METHOD FOR ITS OPERATION

CROSS REFERENCE TO RELATED APPLICATIONS

This application is a United States National Phase application of International Application PCT/DE2007/002123 and claims the benefit of priority under 35 U.S.C. §119 of German Patent Application DE 10 2007 003 118.3 filed Jan. 15, 2007, the entire contents of which are incorporated herein by reference.

FIELD OF THE INVENTION

The invention relates to a method for operation of a magnetic levitation railway, comprised of a track path and a magnetic levitation vehicle with a plurality of supporting magnets and supporting runners allocated to these, with the magnetic levitation vehicle being maintained by means of supporting magnets in a levitated status during its travel along a track path and to a magnetic levitation railway.

BACKGROUND OF THE INVENTION

There are numerous proposals known and already implemented into practice for the operation of magnetic levitation railways of this kind. All these methods throughout are based on the principle of propelling and braking the magnetic levitation vehicles in normal operation with a driving and braking system, which for example comprises a long stator linear motor as well as control and regulating devices destined for its operation (DE 38 07 919 C2, DE 10 2004 018 311 A1). A long stator linear motor of this kind comprises a long stator installed in a track path and comprised of grooves and alternating current windings laid in them by means of which advancing migration waves are generated along the track path. The exciter field of the long stator linear motor is generated by supporting magnets arranged in the vehicles which moreover also fulfil the function of carrying which is required to obtain levitation. The frequency of the migration waves determines the velocity of vehicles.

To enable the vehicles to come to a controlled standstill in case of a failure of the driving and braking system regardless of where they are currently located and regardless of the velocity at which they are currently running, these vehicles are provided with an additional brake in form of a clasp brake (DE 30 04 705 A1), an eddy-current brake (DE 10 2004 013 994 A1) or the like. Additional brakes of this kind are also used in the event of other disturbances, for example in case of loss of localization. In all these cases, the additional brake ensures that the vehicles can safely be brought to a standstill at any of the destination stopping points existing along a track path, which may also be usual railway stations.

In practical applications of magnetic levitation railways, eddy-current brakes are preferably used as additional brakes. These are allocated to guide rails installed at the track path and they generate eddy-currents braking in them. However, eddy-current brakes have a disadvantage in that the comparably high current rates needed for their operation can be generated in the magnetic levitation vehicles themselves only at velocities above approximately 100 km/h, e.g. by the aid of so-called linear generators. At lower speeds, on the contrary, these currents must be supplied by batteries accommodated in the vehicles. Consequently and despite the fact that eddy-current brakes usually are activated only in case of disturbance, a plurality of batteries is needed which is undesirable due to additional weight and major space requirements involved thereby. In other words, magnetic levitation vehicles must always be operated in such a manner and destination stopping points arranged along the track path must always be chosen in such a manner that the batteries provided in the vehicles are always and safely available for an emergency braking. Conversely, the electrical energy needed in cases of emergency for the function of "carrying" is comparably insignificant.

SUMMARY OF THE INVENTION

Now, therefore, the underlying technical problem to be solved by the present invention is to configure the magnetic levitation railway of the afore-mentioned species and the relevant method for its operation in such a manner that batteries of the kind described hereinabove can largely be dispensed with while safe braking is nevertheless ensured.

According to the invention a method is provided for operation of a magnetic levitation railway, comprised of a track path and a magnetic levitation vehicle with a plurality of supporting magnets and supporting runners allocated to these. The magnetic levitation vehicle is maintained by means of supporting magnets in a levitated status during its travel along a track path. The vehicle is settled on the track path by means of supporting runners at destination stopping points by switching-off the supporting magnets and being gradually slowed down before it reaches a destination stopping point. The braking is solely induced or supported by switching-off at least one of the supporting magnets already before the destination stopping point is reached and by settling the magnetic levitation vehicle by means of the supporting runner allocated to this supporting magnet onto the track path, such that the vehicle is brought to a standstill at the destination stopping point by exploiting the frictional forces thus generated.

According to a further aspect of the invention, a magnetic levitation railway is provided comprised of a track path, at least one magnetic levitation vehicle movable along a track path and having a plurality of supporting magnets as well as supporting runners allocated to these. The magnetic levitation vehicle is maintained in a levitated status during the travel by means of supporting magnets and is settled with the supporting runners on the track path at destination stopping points by switching-off the supporting magnets. The magnetic levitation railway also includes a propellant and braking system for the magnetic levitation vehicle and an additional brake for gradual braking of the magnetic levitation vehicle in the event of a disturbance occurring before a destination stopping point is reached. The additional brake just contains the supporting runners as active braking elements and is provided with means to switch-off selected supporting magnets in order to settle down the vehicle onto the track path in the event of a disturbance already before the destination stopping point is reached by means of the supporting runners allocated to the switched-off supporting magnets.

The present invention bears the advantage in that frictional forces which result on depositing the vehicles between the supporting runners and the track path are utilized for the braking process. For this purpose, depending on the momentary situation, only one, a plurality of or all the existing supporting runners can be utilized for the braking process. Wear or tear of supporting runners or of the gliding rails of the track path interacting with them are largely harmless, because this type of braking is only applied in case of disturbance and therefore almost never or at least extremely rarely, as has been outlined hereinabove. Furthermore it is of advantage that the supporting runners are in any way already provided on the vehicles and so the otherwise usually applied sophisticated additional brakes in form of eddy-current brakes or the like may be entirely dispensed with. Besides, batteries—if at all required—with a low accumulator capacity are needed to be able to sustain the carrying function of supporting magnets for as long as this is required.

The braking effect caused by depositing magnetic levitation vehicles onto their supporting runners is in principle known (DE 10 2004 018 311 A1). In the case known, the braking effect, however, is the consequence of a simultaneous shutoff of all exciter fields and/or supporting magnets which is caused for other reasons and initiated by the vehicles, with the aim to instantly prevent any disturbance of the driving and braking system in the area of destination stopping points, for example an erroneous acceleration or an acceleration effected in the wrong direction instead of a braking. Conversely, according to the present invention, the frictional forces between supporting runners and track path are utilized in a controlled and well-aimed manner to render additional brakes unnecessary, with it being possible to control the braking force without any difficulty even from a central log computer arranged outside the magnetic levitation vehicles.

The present invention is elucidated in greater detail as set forth below by way of the attached drawings, taking an embodiment as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
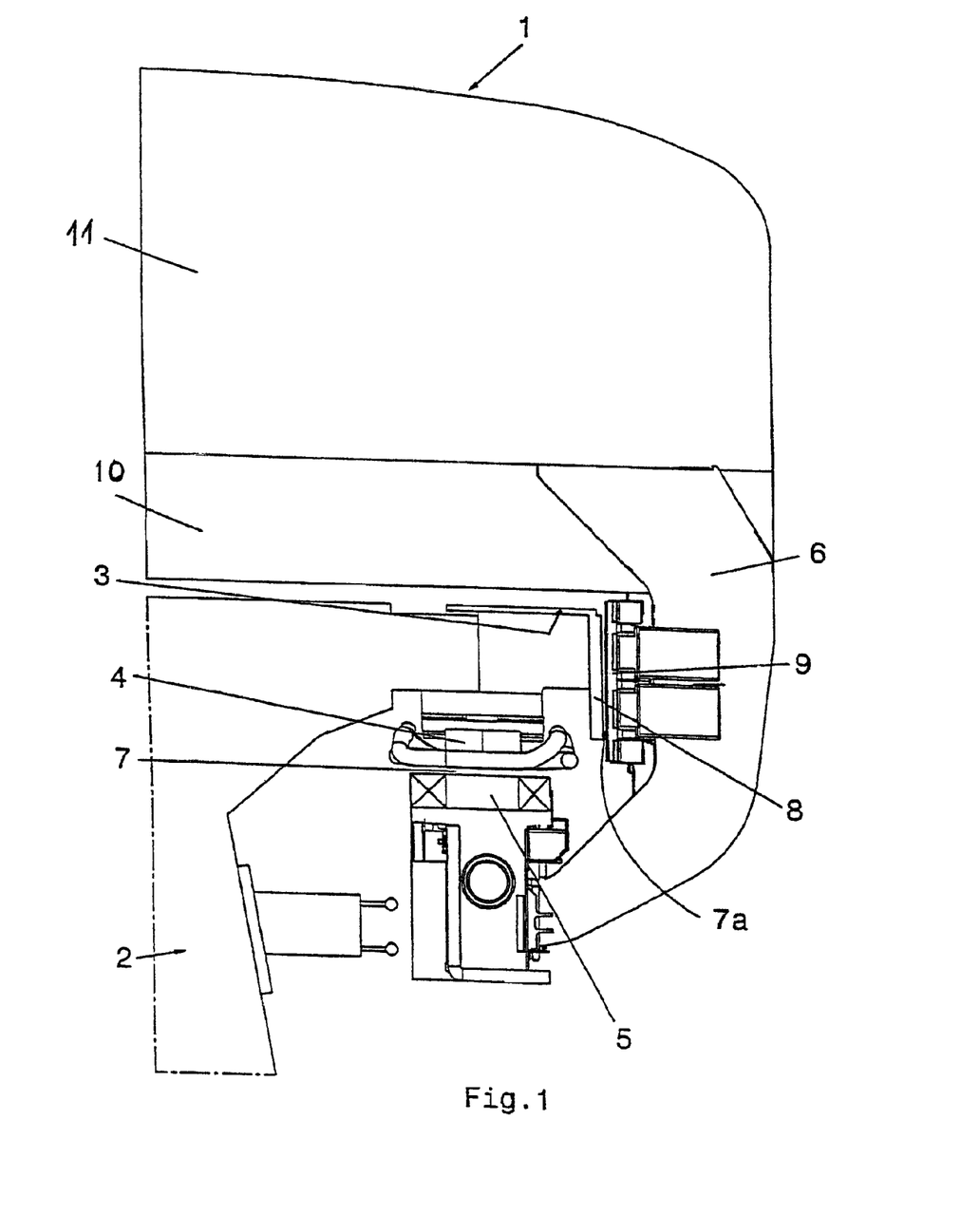
FIG. 1 is a schematic partial cross-section through a conventional vehicle of a magnetic levitation railway.

Referring to the drawings in particular, FIG. 1 schematically shows a cross-section trough a magnetic levitation vehicle 1 which is mounted in a usual manner to be operable on a track path that comprises beams 2 made of steel and/or concrete as well as gliding rails 3 mounted on them. Vehicle 1 is driven by means of a long stator linear motor which comprises stator packets arranged in successive order in longitudinal direction and fixed underneath the gliding rails 3. Stator packets 4 have teeth and grooves succeeding in alternation and not shown here which are fed with a three-phase current of a variable amplitude and frequency. The actual exciter field of the long stator linear motor is generated by at least one supporting magnet arrangement 5 which is fastened by at least one lateral rack stirrup 1 to vehicle 1 and which comprises magnet poles facing the stator packets 4. The supporting magnet arrangement 5 not only provides the exciter field but also fulfils the function of carrying and levitating by maintaining a defined gap 7 of 10 mm, for example, between itself and the stator packets 4 during operation of vehicle 1.

For track gauging of vehicle 1, the beams 2 are comprised of laterally arranged reaction and/or lateral guiding rails 8 faced by guiding magnet arrangements 9 mounted on rack stirrups 6 which serve to maintain a gap 7a corresponding to gap 7 between itself and the reaction rail 8 during operation. The supporting magnet arrangement 5 shown in FIG. 1 and the guiding magnet arrangement 9 each form a magnet system fastened to rack stirrups 6 for the functions of "carrying" and "guiding", respectively. But it is obvious that a plurality of such magnet systems can be mounted at vehicle 1 side by side or one behind the other in the direction of travel, said magnet systems being connected by means of rack stirrup 6 to a non-bending bogie and/or levitation rack 10 comprised of longitudinal and transversal trusses and supporting a car box 11 of the vehicle 1 (FIG. 1) which is provided with a passenger cell.

Figure 2:
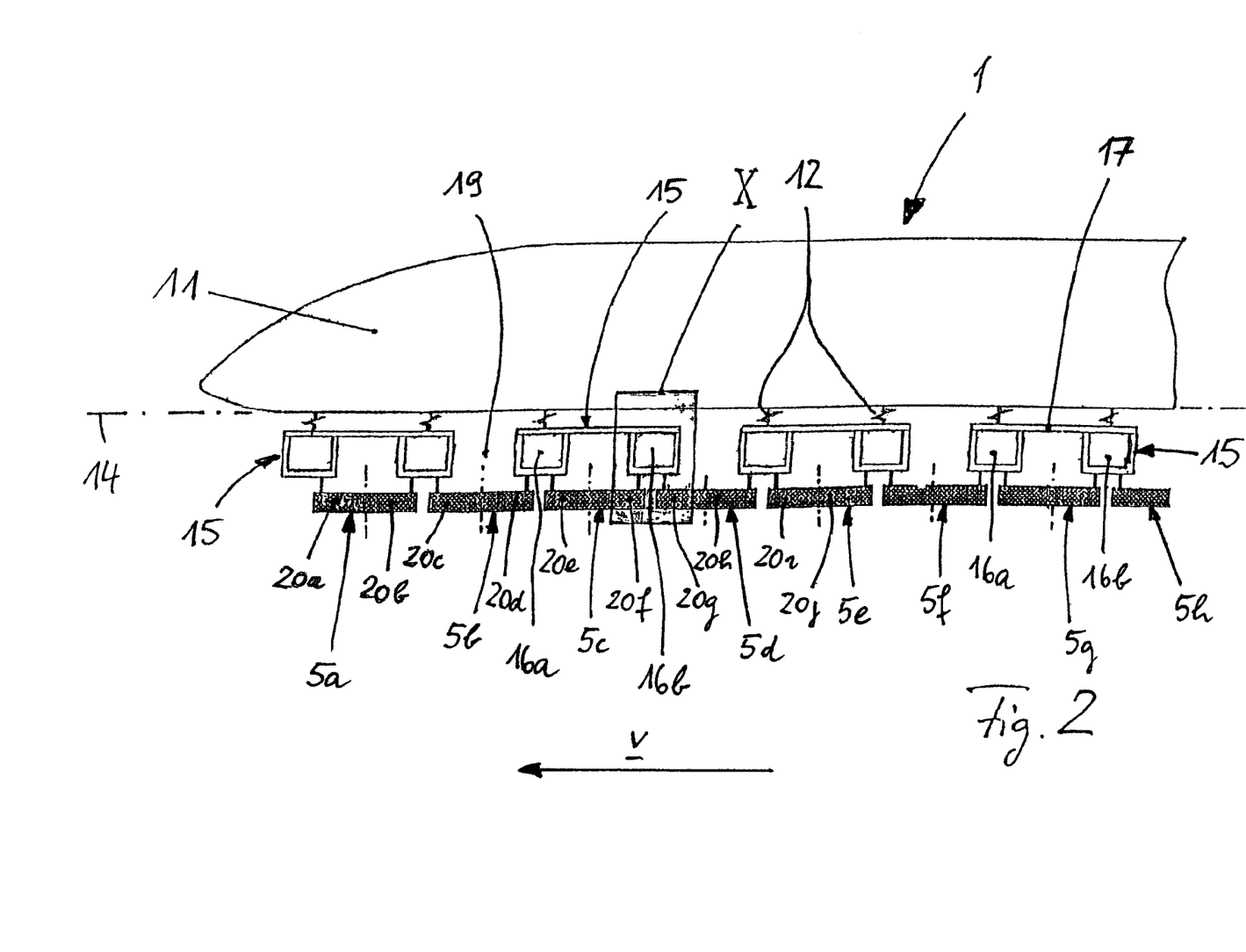
FIG. 2 is details of part of the vehicle as per FIG. 1 in a simplified schematic side view.

According to FIG. 2, there are several pneumatic springs 12 mounted at the underside of car box 11 and spaced in the direction of a vehicle longitudinal axis 14 and a traveling direction running in parallel thereto (arrow v). The pneumatic springs 12 take effect on front and rear ends of levitation bogy sections 15 which on the whole form the levitation bogie 10 (FIG. 1). In the practical example, each levitation bogie section 15 comprises two supporting elements 16a, 16b arranged one behind the other the direction of longitudinal axis 14 in form of framed parts or the like and longitudinal girders 17 connecting these firmly to each other, with the supporting element 16a each being located at the front viewed in the direction of travel.

According to FIG. 2, the vehicle 1 furthermore comprises a multitude of supporting magnet arrangements $5a \ldots 5h$ arranged one behind the other viewed in the direction of travel. Each supporting magnet arrangement $5a \ldots 5h$ is subdivided by an imaginary center plane indicatively shown by a dotted line 19 into two electrically separate though mechanically coherent halves. Each half contains a certain number of six magnet poles, for example, the windings of which form a group, each of which can be supplied with electric current independently of all other groups. Each supporting magnet arrangement $5a \ldots 5h$ therefore is comprised of a constructively coherent component comprising twelve magnet poles, for example, but electrically it is comprised of two parts separated from each other which for simplicity's sake are designated as supporting magnets $20a$, $20b$, and/or $20c$, $20d$, etc. and/or $20$ I, $20j$ as set forth below in FIG. 2.

Figure 3:
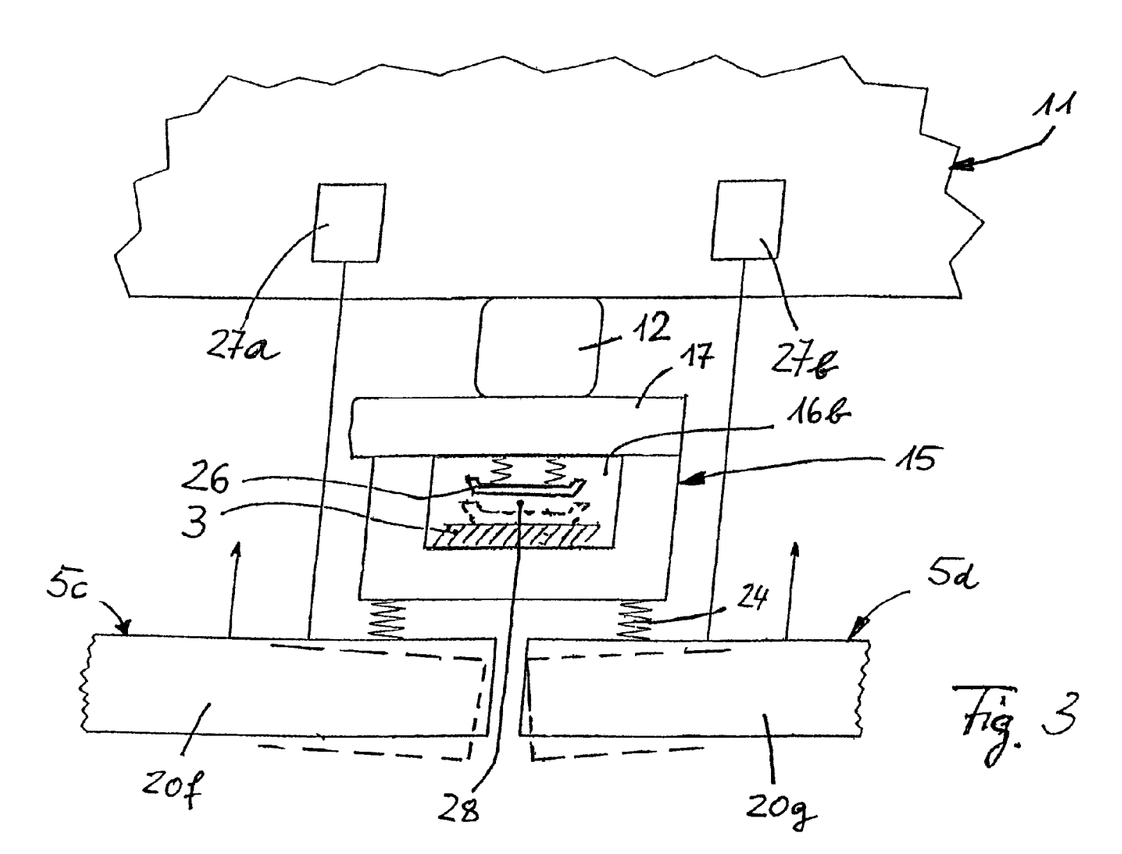
FIG. 3 is an enhanced detail X of the vehicle as per FIG. 2 with further components.

From FIGS. 2 and 3, it furthermore becomes evident that each supporting element $16a$, $16b$ is connected with two each of the supporting magnets $20a \ldots 20j$. For example, the front-end supporting element $16a$ of one of the levitation bogie sections 15 at its front side is connected with the rear supporting magnet $20d$ of a supporting magnet arrangement $5b$ running ahead of it and connected at its rear side with the front side supporting magnet $20e$ of a supporting magnet arrangement $5c$ running behind, while the rear side supporting element $16b$ of the same levitation bogie section 15 is accordingly connected with the rear side supporting magnet $20f$ of the supporting magnet arrangement $5c$ and the front side supporting magnet 20g of the supporting magnet arrangement 5d etc. running behind.

In accordance with FIG. 3, the connection of the supporting elements 16a, 16b and/or of the associated rack stirrups 6 not shown in FIG. 3 with the supporting magnets 20a . . . 20j is effected through additional springs 24. Besides, it is obvious that the levitation bogie sections 15 and the supporting magnet arrangements 5a . . . 5h are so articulated with each other that the required relative movements towards each other can be executed both during curve rides of vehicles 1 and during rides uphill and downhill.

Finally, in a schematic representation, too, though slightly different to the one shown in FIG. 1, FIG. 3 shows one of the gliding rails 3 and a supporting runner 26 allocated to it and fastened to the underside of the levitation bogie section 15. By means of these supporting runners 26, the vehicle 1 is settled onto the track path and/or its gliding rails 3, if the supporting magnets (20a . . . 20j) are de-energized. According to FIG. 3, such a supporting runner 26 is preferably allocated to each supporting element 16a, 16b of the levitation bogie 10, said supporting runner being settled on the associated gliding rail 3 when two allocated supporting magnets, e.g. 20f, 20g in FIG. 3, are de-energized.

Besides it is clear that the configurations described hereinabove, more particularly the supporting magnet arrangements 5a . . . 5 and the supporting runners 26 are preferably provided both on the right and on the left side of the vehicle in identical form.

The supply of electrical current to the supporting magnet arrangements 5a . . . 5h and/or supporting magnets 20a . . . 20j is performed by the aid of control circuits (e.g. 27a and 27b in FIG. 3) which for example are accommodated in a car box 17 and which in their levitated status serve to sustain the air gap 7 (FIG. 1) between the supporting magnet arrangements 5a . . . 5h and stator packets 4. In this case, there is a corresponding gap 28 (FIG. 3) between the supporting runners 26 and the gliding rails 3.

Figure 4:
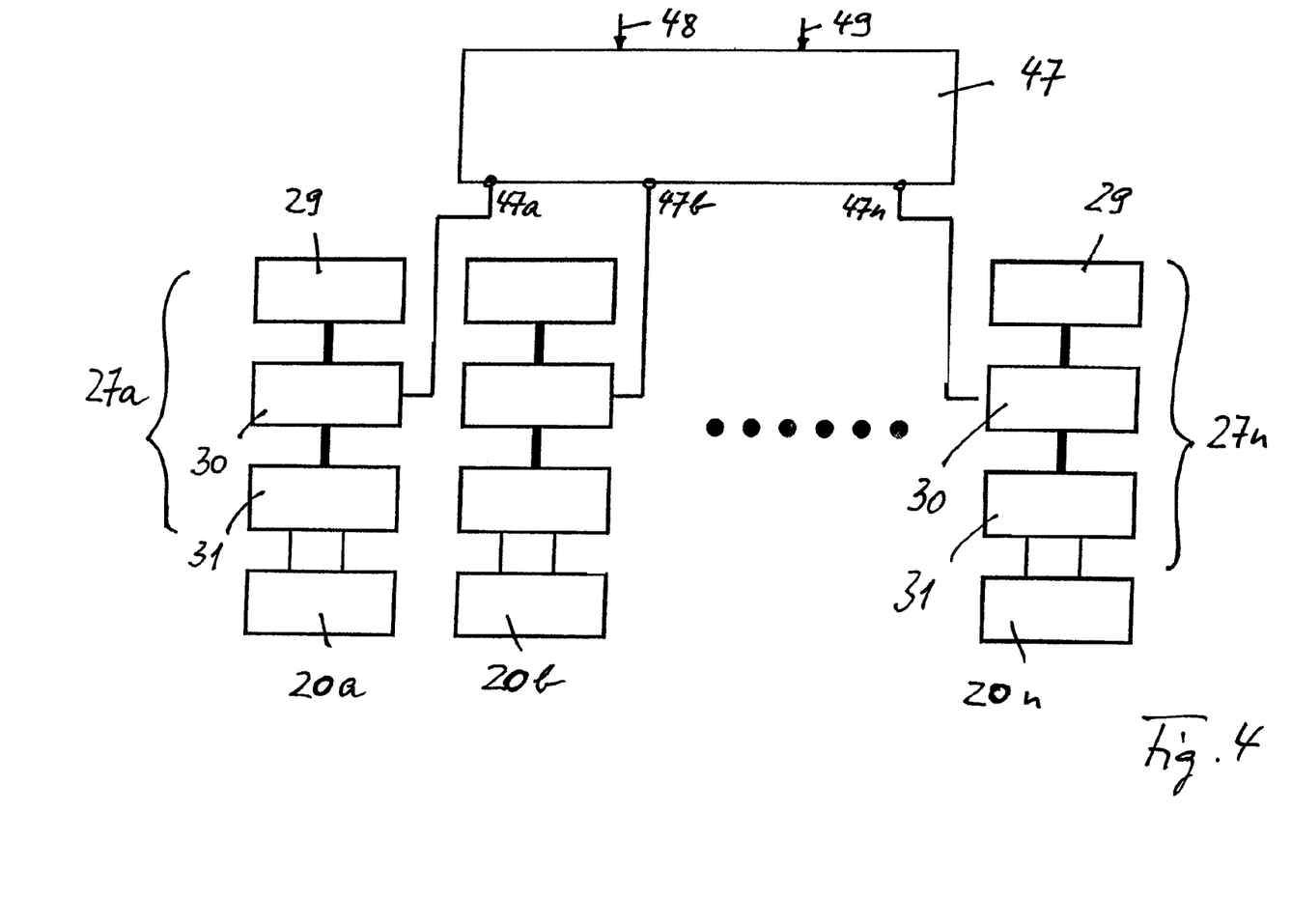
FIG. 4 is a schematic block circuit diagram to control the inventive braking function with a vehicle according to FIG. 2 and FIG. 3.

The control circuits 27a, 27b, . . . 27n connected to various supporting magnets 20a . . . 20j are schematically shown in FIG. 4, wherein n is equivalent to 2k in the practical example, if k is the number of existing supporting magnet arrangements 5a . . . 5. In this case, as described hereinabove, it is assumed that the windings of each supporting magnet 20a . . . 20j can be supplied with electric current by the aid of a separate control circuit 27a . . . 27n (e.g. DE 10 2004 012 748 A1). Each control circuit 27a . . . 27n moreover comprises at least one gap sensor 29 according to FIG. 4, which measures the actual value of gap 7, as well as a control element 30 connected to sensor 29 which compares the actual value with a defined design value and which generates a differential and/or actuator signal, and it comprises an electric current actuator 31 which is fed with this actuating signal and by means of which the electric current is controlled through the windings of the supporting magnet 20a . . . 20j connected to it in such a manner that the carrier gap 7 mainly remains constant as long as it is desired to keep vehicle 1 in the levitated status. Expediently, all control circuits 27a . . . 27n are of an identical set-up and structure.

Magnetic levitation railways of the kind described are generally known, for example, from documents DE 38 07 919 C2, DE 10 2004 012 748 A1, DE 10 2004 013 690 A1 and DE 10 2004 018 311 A1, which therefore, to avoid further explanations, herewith become the object of the present disclosure by taking reference to them. Corresponding United States patent publications U.S. Pat. No. 4,988,061; US2008252405, Canadian patent publication CN1842455 and United States patent publication US2008277534 are equivalent English language documents incorporated herein by reference.

While usual magnetic levitation railways comprise an additional brake configured as a clasp brake, eddy-current brake or the like apart from the propellant and braking system described as an example, an additional brake is provided in accordance with the present invention which merely comprises the supporting runners 26 (FIG. 3) as active braking elements. In particular, the present invention assumes that the frictional forces between supporting runners 26 and gliding rails 3 are sufficiently high to be able to safely induce the necessary retardation of vehicle 1 in case of emergency. Moreover, the present invention takes benefit of the fact that the gaps 7, 28 existing between vehicle 1 and track path 2, 3 are so small that the supporting runners 26 can be settled independently of each other onto the track path and/or onto the relevant gliding rails 3 by reason of the fact that the relevant supporting magnets 20a . . . 20j are switched off. This is indicated in FIG. 3 schematically and in exaggerated size by way of dashed lines, according to which the supporting runner 26 shown there can be settled on gliding rail 3 independently of all the other existing supporting runners 26 by reason of the fact that the electric currents flowing through the windings of the allocated supporting magnets 20f and 20g are switched-off by means of the control circuits 27a and 27b, so that these supporting magnets 20f and 20 lose their function of carrying. FIG. 3 shows that the two supporting magnets 20f and 20 as compared with the not shown stator packets 4 are lowered which is feasible due to their articulated connections with the associated levitation bogie sections 15, even though the other supporting magnets 20a . . . 20g and/or supporting magnet halves are continually supplied with electric current.

Figure 5:
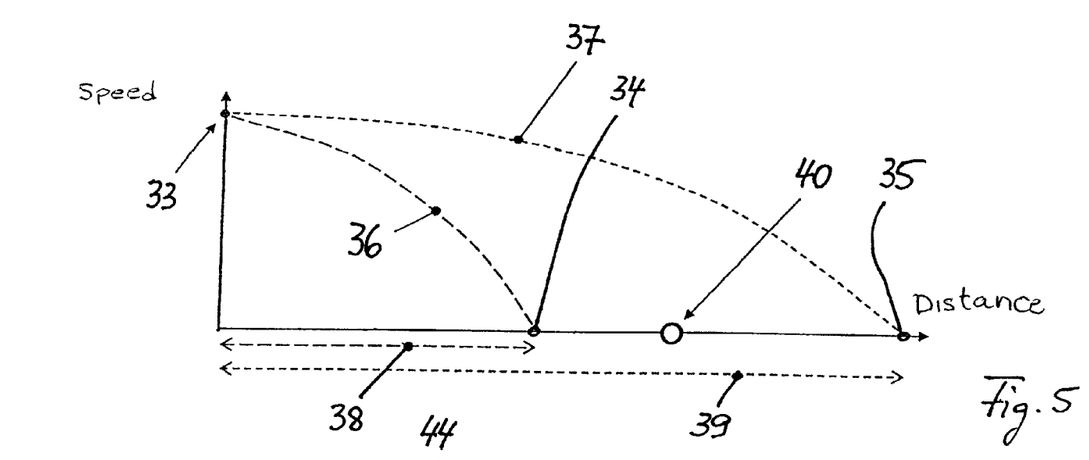
FIG. 5 is a graph of potential braking curves for a vehicle according to FIG. 2 and FIG. 3.

The limits of braking enabled in this manner are shown and represented in FIG. 5.

Proceeding from a location 33 plotted alongside of an abscissa, a vehicle moving at a velocity plotted alongside of the ordinate and to be slowed down while the propellant and braking system has been shut-off for whatever reason can maximally reach a location 34, if all supporting runners 26 at location 33 are simultaneously settled onto the gliding rails 3. Conversely, if merely the propellant and braking system is switched-off while the vehicle is continually kept in levitated status, the vehicle would reach a location 35. The position of both locations 34, 35 on the one hand depends in particular on the velocity which the vehicle had attained at location 33. On the other hand, the crucial factors for the position of location 34 above all are the friction conditions between supporting runners 26 and gliding rails 3 as gliding partners, depending on current weather (e.g. dry, wet, etc.), while wind conditions (headwind, tailwind, etc) are of some significance for reaching a location 35. In both cases, the distance profile (e.g. planar, rising or falling distance) is noticeable. Braking curves 36, 37 leading to locations 34 and 35 are shown in hatched lines in FIG. 5. Moreover, the length of each braking distance is shown by arrows 38, 39 underneath the abscissa.

If the positions of selected destination stopping points 40 (FIG. 5 and FIG. 6) are usually so chosen that the vehicle being in levitated status can still safely reach the stoppage area following next in the direction of travel when the propellant and braking system fails to work (e.g. DE 38 07 919 C2 corresponding to U.S. Pat. No. 4,988,061), then the next destination stopping point approachable in case of a disturbance and designated with reference number 40 in FIG. 5 will in any case lie upstream of location 35 in the direction of travel v. Conversely, with regard to location 34 lying upstream to the destination stopping point 40, it is assumed that in the event of a failure the vehicle still is that far away from the destination stopping point 40 that it can be timely slowed down at least by settling all supporting runners 26. If this were not the case, the vehicle would have to remain in levitated status for as long as required to be able to reach the stopping area following next to location 35 along the travel distance. Since by considering various possible friction conditions, wind velocities, etc. proceeding from any location 33 along the travel distance a most favorable and a least favorable (worst case) braking curve 36 and/or 37 will result, the assumption constantly taken for the purpose of the present invention and for the following description expediently is that the braking curves 36, 37 in FIG. 5 each represent the least favorable case.

Figure 6:
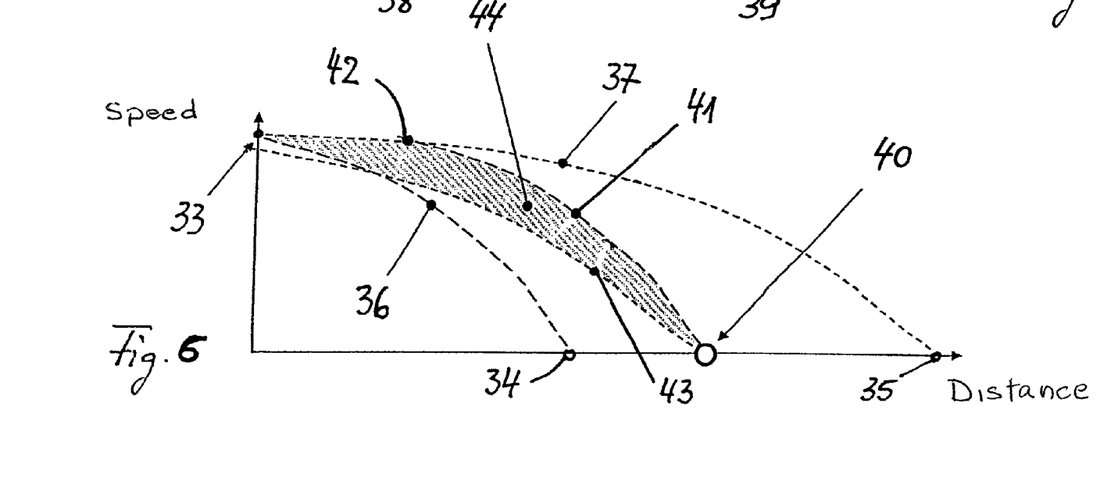
FIG. 6 is a graph of potential braking curves for a vehicle according to FIG. 2 and FIG. 3.

The possibilities resulting hereof are indicated in FIG. 6. It is again assumed that the nearest stopping area following in the direction of travel is defined by the destination stopping point 40. At this destination stopping point 40, a braking curve 41 terminates which represents the case that all supporting runners have been settled. A safe hold at the destination stopping point 40 therefore is just possible by a simultaneous settling of all supporting runners 26, if braking is initiated latest at a point 42. Conversely, in case the vehicle is still far enough away from location 33, the destination stopping point 40 could also be reached in levitated status along a braking curve 43.

Figure 7:
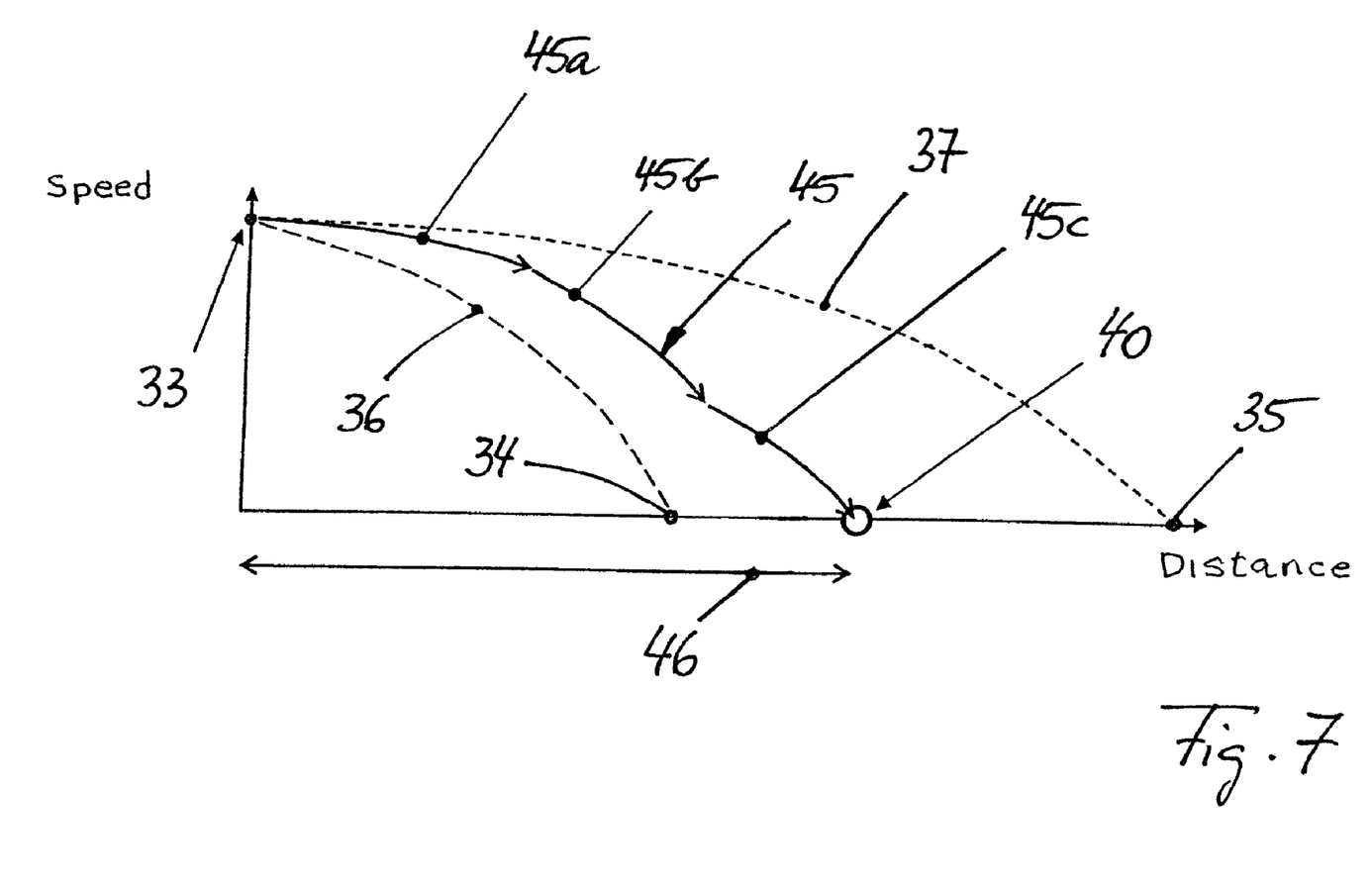
FIG. 7 is a graph of induced braking curves for a vehicle as per FIG. 2 and FIG. 3.

Finally FIG. 6 shows that depending on where braking of the vehicle is initiated, a hatched area section is obtained which represents an operation area 44 applicable in the worst case. This operation area 44 is confined by braking curve 41 at the top and by braking curve 43 at the bottom, and it indicates that within the hatched area it is possible to perform different and possibly combinable braking maneuvers by depositing some, all, or no supporting runners 26 at all in order to ultimately safely reach the destination stopping point 40. In this regard, FIG. 7 represents an example according to which the destination stopping point 40 is reached because the number of supporting runners 26 which the vehicle glides on is varied, thus leading within operation area 44 according to FIG. 6, for example, to a braking curve 45 comprised of three sections 45a, 45b, and 45c. Section 45a results by the fact that initially just a few supporting runners 26 are settled in order to support the braking also initiated in levitated status after the shutoff of the propellant and braking system, which, however, would not be sufficient to reach destination stopping point 40. Therefore, in section 45b, further or all supporting runners 26 are settled. As this would cause a standstill of the vehicle before destination stopping point 40 is reached, some supporting runners 26 are finally lifted again in section 45c in order to avoid that the vehicle comes to a premature standstill. The braking distance after the beginning of the braking process (location 33 is identified by an arrow 46 in FIG. 7.

The braking curve 45 in FIG. 7 thus shows that the friction forces required to reach the destination stopping points are generated by the number of supporting runners 26 on which the magnetic levitation vehicle is settled and by the points of time at which this occurs. Moreover, the required friction forces are of course permanently calculated and corrected, if required, depending on the current velocity of the vehicle and on its distance to destination stopping point 40.

Figure 8:
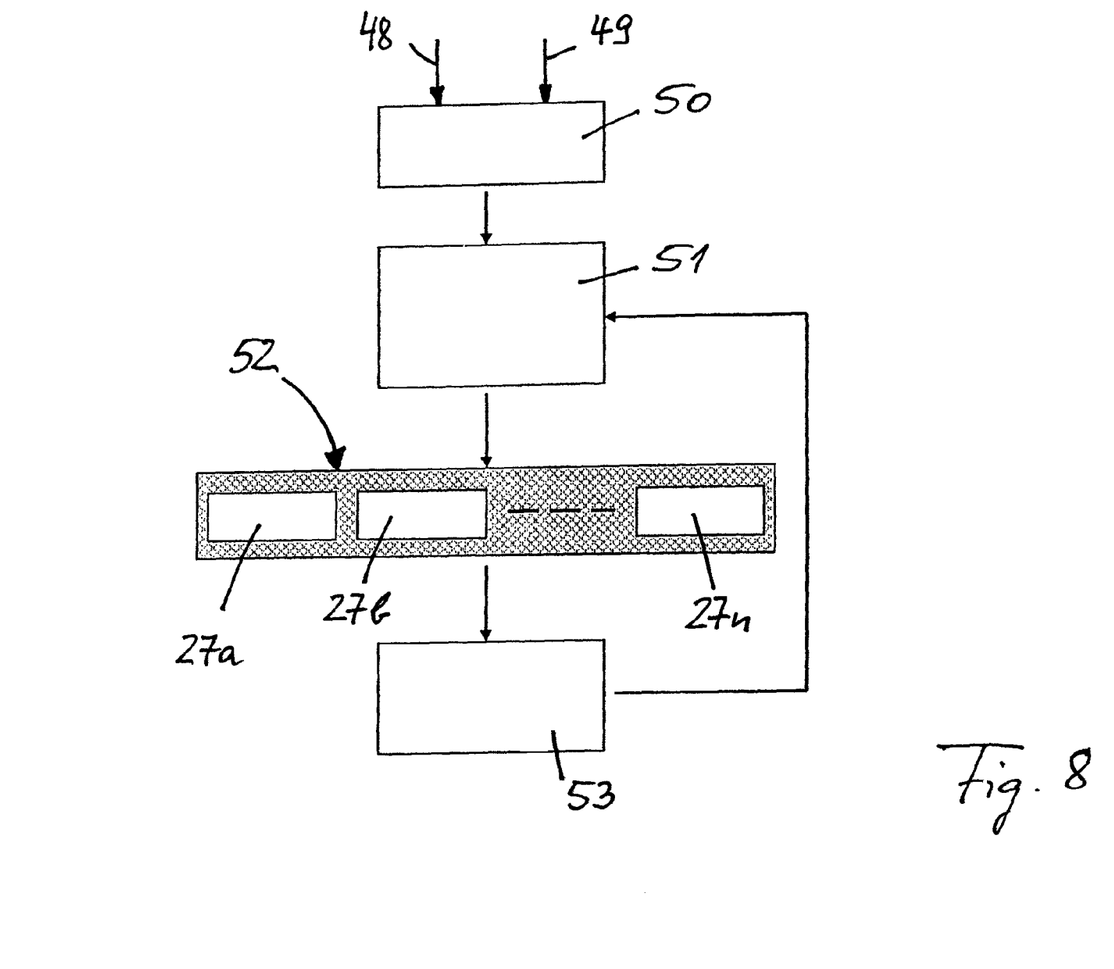
FIG. 8 is a schematic flow diagram for executing an inventive braking process.

An example for the practical application of the inventive method becomes evident from FIGS. 4 and 8. FIG. 4 shows a computer 47 which is comprised of ports 47a to 47n that are linked to control elements 30 of control circuits 27a ... 27n. Via ports 47a ... 47n, the control elements 30 linked to them are so controlled that selected supporting magnets 20a ... 20j are switched-off, i.e. de-energized. For example, if it is intended to lower supporting runner 26 shown in FIG. 3, the position of which in vehicle 1 becomes evident from FIG. 2, then the two supporting magnets 20f, 20g are switched-off via computer 47. If it is intended to lift supporting runner 26 again later on (e.g. section 45c in FIG. 7), the mentioned supporting magnets 20f, 20g are switched-on again by means of computer 47. Switching the supporting magnets 20a ... 20j and/or supporting magnet halves on an off can be effected, for example, by presetting an infinitely high design value for carrier gap 7 to the control elements 30.

FIG. 8 schematically shows how to compute the braking curve (e.g. 45 in FIG. 7) in an individual case. According to FIG. 4, computer 47 is permanently fed with signals in a well known manner (e.g. DE 38 07 919 C2), which indicate the current vehicle position (line 48) and the current vehicle velocity (line 49). In the event of a disturbance which entails a shutoff of the propellant and braking system, then based on these values and based on the values saved in a computer 47 concerning the friction and wind conditions or the like to be considered in the worst case as well as based on a fixed program, the computer 47 can initially determine the nearest destination stopping point 40 eligible in the sense of the description given hereinabove (box 50 in FIG. 8). Subsequently computer 47 will compute which supporting runners 26 are to be settled in an individual case and when this is to occur, i.e. the number of supporting runners 26 to be applied and the points of time at which these are to be settled will be computed (box 51 in FIG. 8). It is self-evident that the computed points of time always mean that the vehicle has reached a certain location along the travel distance.

As a result of these computations, the control elements 30 of various control circuits 27a ... 27n are subsequently instructed to switch the associated supporting magnets 20a ... 20j and/or supporting magnet halves either on or off (block 52 in FIG. 8). Finally, a block 53 in FIG. 8 is to indicate that based on the relevant actual position and actual velocities of the vehicle it is constantly and newly calculated whether the braking maneuver initiated by computer 47 leads to the target and whether the vehicle is in fact so slowed down that it safely reaches the destination stopping point 40 (FIG. 7) and comes to a standstill there. If required, the selected deposition procedures are frequently repeated, corrected and adapted to varying environmental conditions.

The described manner of braking entails various advantages. Above all it is of some advantage that the number and capacities of the required batteries can be much less than hitherto, because no electrical energy is needed for the actual braking procedure. Furthermore, owing to the plurality of existing supporting runners 26 it yields high redundancy, a reduction in production and maintenance cost because of the omission of additional braking facilities, and a uniform load distribution during the braking procedure on condition of a correct selection of settled supporting runners. The latter is preferably determined in the program of computer 47 in that it is always demanded that those carrying runners 26 on which the vehicle 1 is settled will lead to the most uniform possible load distribution (e.g. at right, left, front, rear, etc).

The present invention is confined to the described practical example which can be diversified in great variety. More particularly, the number of existing supporting runners 26 and their arrangement alongside of the vehicle are largely free to choose. Furthermore, it is possible to choose the relative positions of supporting magnet arrangements 5a ... 5h, supporting magnets 20a ... 20j and supporting runners 26 in a different manner than the one shown in FIG. 3. Moreover, the supporting magnet arrangements 5a ... 5h can be provided with more than two individually controllable parts and/or groups of magnet poles. It would also be possible to allocate a single supporting magnet 20a ... 20j to each supporting runner 26. Besides, the way of determining the braking curves and the choice of the number of settled supporting runners resulting thereof as well as of the point of time at which these are settled can largely be made dependent on the individual case and be varied. Finally, it is self-evident that the various features can also be applied in combinations other than those described and illustrated hereinabove.

While specific embodiments of the invention have been described in detail to illustrate the application of the principles of the invention, it will be understood that the invention may be embodied otherwise without departing from such principles.

The invention claimed is:

1. A method for operation of a magnetic levitation railway comprised of a track path and a magnetic levitation vehicle with a plurality of supporting magnets and supporting runners allocated to these, the method comprising the steps of:
   maintaining the magnetic levitation vehicle by means of supporting magnets in a levitated status during travel of the magnetic levitation vehicle along a track path;
   settling the magnetic levitation vehicle on the track path by means of supporting runners at destination stopping points by switching-off the supporting magnets; and
   gradually slowing the magnetic levitation vehicle down before the magnetic levitation vehicle reaches a destination stopping point, wherein braking is solely induced or supported by switching-off at least one of the supporting magnets before the destination stopping point is reached and by settling the magnetic levitation vehicle by means of the supporting runner allocated to the at least one supporting magnet onto the track path, and brought to a standstill at the destination stopping point by exploiting frictional forces thus generated, wherein the frictional forces required to reach the destination stopping point are generated by a number of supporting runners onto which the magnetic levitation vehicle is settled and by points of time at which occurs settling of the magnetic levitation vehicle onto the number of supporting runners, wherein said braking is provided by a brake, said brake comprising a computer, said computer determining the number of supporting runners, onto which the magnetic levitation vehicle is to be settled, and the points of time at which the magnetic levitation vehicle is to be settled, depending on a velocity of the magnetic levitation vehicle and a distance from the magnetic levitation vehicle to the destination stopping point.

2. A method as defined in claim 1, wherein the frictional forces are generated depending on the velocity of the magnetic levitation vehicle and its distance to the destination stopping point.

3. A method as defined in claim 1, wherein the supporting runners on which the magnetic levitation vehicle are settled are so chosen that a uniform load distribution in longitudinal and transversal direction of the magnetic levitation vehicle is achieved.

4. A method as defined in claim 1, wherein the number of supporting runners on which the magnetic levitation vehicle is settled is monitored and varied, as required, during a braking procedure.

5. A method as defined in claim 1, wherein the supporting magnets are linked to control circuits which serve to establish a pre-selected gap between the supporting magnets and the track path during the levitated status, and the computer is connected to the control circuits.

6. A magnetic levitation railway comprising:
   a track path;
   at least one magnetic levitation vehicle movable along a track path and having a plurality of supporting magnets as well as supporting runners allocated to the supporting magnets, said magnetic levitation vehicle being maintained in a levitated status during the travel by means of the supporting magnets and being settled with the supporting runners on the track path at destination stopping points by switching-off the supporting magnets;
   a propellant and braking system for the magnetic levitation vehicle; and
   an additional brake for gradual braking of the magnetic levitation vehicle in the event of a disturbance before a destination stopping point is reached, wherein the additional brake exclusively employs the supporting runners as active braking elements and is provided with means to switch-off selected supporting magnets in order to settle down the vehicle onto the track path in the event of a disturbance before the destination stopping point is reached by means of the supporting runners allocated to the switched-off supporting magnets, said additional brake comprising a computer which is equipped to determine a number of supporting runners, onto which the magnetic levitation vehicle is to be settled, and points of time at which the magnetic levitation vehicle is to be settled on the number of supporting runners, depending on a velocity of the magnetic levitation vehicle and a distance of the magnetic levitation vehicle to the destination stopping point.

7. A magnetic levitation railway as defined in claim 6, wherein the supporting magnets are linked to control circuits which serve to establish a pre-selected gap between the supporting magnets and the track path during the levitated status, and that the computer is connected to the control circuits.

8. A method for operation of a magnetic levitation railway, the method comprising:
   providing a magnetic levitation railway with a track path a magnetic levitation vehicle movable along a track path with a plurality of supporting magnets as well as supporting runners allocated to the supporting magnets, a propellant and braking system for the magnetic levitation vehicle and an additional brake for gradual braking of the magnetic levitation vehicle in the event of a disturbance before a destination stopping point is reached, wherein the additional brake exclusively employs the supporting runners as active braking elements and is provided with means to switch-off selected supporting magnets;
   maintaining the magnetic levitation vehicle, by means of the supporting magnets, in a levitated status during travel of the magnetic levitation vehicle along a track path; and
   settling the magnetic levitation vehicle on the track path by means of the supporting runners at destination stopping points by switching-off the supporting magnets and gradually slowing the magnetic levitation vehicle down before the magnetic levitation vehicle reaches a destination stopping point and switching-off at least one of the supporting magnets before the destination stopping point is reached and by settling the magnetic levitation vehicle by means of the supporting runner allocated to the at least one supporting magnet onto the track path, and brought to a standstill at the destination stopping point by exploiting frictional forces thus generated, wherein the frictional forces required to reach the destination stopping point are generated by selecting a number of supporting runners onto which the magnetic levitation vehicle is settled and by selecting points of time at which the magnetic levitation vehicle is to settle onto the number of supporting runners.

9. A method as defined in claim 8, wherein the frictional forces are generated depending on the velocity of the magnetic levitation vehicle and its distance to the destination stopping point.

10. A method as defined in claim 8, wherein the supporting runners on which the magnetic levitation vehicle are settled are selected such that a uniform load distribution in longitudinal and transversal direction of the magnetic levitation vehicle is achieved.

11. A method as defined in claim 8, wherein the number of supporting runners on which the magnetic levitation vehicle is settled is monitored and varied, as required, during braking using the additional brake for gradual braking.

12. A method as defined in claim 8, wherein said additional brake comprises a computer, said computer determining the number of supporting runners, onto which the magnetic levitation vehicle is to be settled, and the points of time at which the magnetic levitation vehicle is to be settled on the number of supporting runners, depending on the velocity of the magnetic levitation vehicle and a distance from the magnetic levitation vehicle to the destination stopping point.

13. A method as defined in claim 12, wherein the supporting magnets are linked to control circuits which serve to establish a pre-selected gap between the supporting magnets and the track path during the levitated status, and the computer is connected to the control circuits.

* * * * *